(12) United States Patent
Chacko et al.

(10) Patent No.: US 8,495,659 B1
(45) Date of Patent: Jul. 23, 2013

(54) ELIMINATING REDUNDANCY IN INSTANCE DATA OF DIFFERENT VERSIONED CLASSES IN COMMUNICATION BETWEEN OBJECT REQUEST BROKERS USING A COMMON CLASS DEFINITION

(75) Inventors: Joseph K. Chacko, Sheffield (GB); Aruna A. Kalagananam, Bangalore (IN); Prashanth K. Nageshappa, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/461,231

(22) Filed: May 1, 2012

(51) Int. Cl.
*G06F 13/00* (2006.01)
(52) U.S. Cl.
USPC .......................... 719/316; 719/315; 719/330
(58) Field of Classification Search
USPC ......................................... 719/315, 316, 330
See application file for complete search history.

(56) References Cited

U.S. PATENT DOCUMENTS

| | | | |
|---|---|---|---|
| 6,023,579 A | 2/2000 | Hellgren et al. | |
| 6,125,400 A | 9/2000 | Cohen et al. | |
| 6,301,585 B1 | 10/2001 | Milne | |
| 6,477,701 B1 | 11/2002 | Heistermann et al. | |
| 6,591,272 B1 | 7/2003 | Williams | |
| 6,993,774 B1 * | 1/2006 | Glass | 719/330 |
| 7,756,839 B2 | 7/2010 | Hunter et al. | |
| 8,239,849 B2 * | 8/2012 | Burns et al. | 717/166 |
| 2003/0145315 A1 | 7/2003 | Aro et al. | |
| 2003/0177170 A1 * | 9/2003 | Glass | 709/203 |
| 2004/0064823 A1 * | 4/2004 | Baldwin et al. | 719/315 |
| 2004/0167937 A1 | 8/2004 | Sirois et al. | |
| 2005/0108627 A1 * | 5/2005 | Mireku | 715/513 |
| 2005/0155044 A1 | 7/2005 | Broussard et al. | |
| 2010/0161821 A1 | 6/2010 | Slamkovic | |
| 2011/0029678 A1 | 2/2011 | Buciuc | |

OTHER PUBLICATIONS

"Apache Thrift," http://thrift.apache.org, 2011.
"Protocol Buffers," http://code.google.com/apis/protocolbuffers, 2011.
"Java Distributed Computing," Section 3.5 CORBA, http://docstore.mik.ua/orelly/java-ent/dist/ch03_05.htm, 2001.
"Introduction to CORBA," http://java.sun.com/developer/onlineTraining/corba/corba.html, 2010.

* cited by examiner

*Primary Examiner* — Andy Ho
(74) *Attorney, Agent, or Firm* — Robert A. Voigt, Jr.; Winstead, P.C.

(57) ABSTRACT

A method, system and computer program product for eliminating redundancy in instance data of different versioned classes in communication between object request brokers (ORBs). An ORB derives common class definitions for the class for both the client and server ORBs from an intersection of the fields present in the different versions of the class maintained at the client and server. The common class definition for the class for the server ORB/client ORB will be relative to the version of the class existing at the client/server. When a common class definition of a class exists, a server/client ORB serializes an instance of the class using its common class definition for the class thereby including only the fields useful for the client/server ORB. By deriving common class definitions for the class, redundant fields are no longer being transmitted between the client and server ORBs thereby reducing the size of data being transmitted.

20 Claims, 9 Drawing Sheets

ELIMINATING REDUNDANCY IN INSTANCE DATA OF DIFFERENT VERSIONED CLASSES IN COMMUNICATION BETWEEN OBJECT REQUEST BROKERS USING A COMMON CLASS DEFINITION

TECHNICAL FIELD

The present invention relates generally to communication of objects adhering to the Common Object Request Broker Architecture (CORBA), and more particularly to eliminating the redundancy in instance data of different versioned classes in communication between object request brokers using a common class definition.

BACKGROUND

The Common Object Request Broker Architecture (CORBA) defines an architecture for distributed objects. The basic CORBA paradigm is that of a request for services of a distributed object. CORBA normalizes the method-call semantics between application objects that reside either in the same address space or remote address space. The CORBA standard defines a set of distributed services to support the integration and interoperation of distributed objects.

The CORBA standard specifies that there is an object request broker (ORB) through which an application interacts with objects. The ORB is a distributed service that implements requests to remote objects. The ORB locates the remote object on the network, communicates the request to the object, waits for the results, and, when available, communicates the results back to the requesting client. ORBs communicate with one another using the General Inter-ORB Protocol (GIOP).

ORB is a piece of middleware software that allows programmers to make program calls from one computer to another via a network. ORBs promote interoperability of distributed object systems because they enable users to build systems by piecing together objects from different vendors so that they can communicate with each other via the ORB.

ORBs handle the transformation of in-process data structures to and from the byte sequence, which is transmitted over the network. This is called marshalling or serialization. The opposite operation, extracting a data structure from a series of bytes, is called unmarshalling or deserialization.

The CORBA standard allows for different versions of a class to exist at both the server and client side in a network system. In cases where there are different versions of a class, the server and/or the client may send and receive extra fields, which are redundant. For example, suppose that the server has version 2 of a particular class, class A, and that the client has version 1 of the same class, class A. If the client ORB (ORB in client) receives instance data for class A from the server ORB (ORB in server), then there may be some data that the client ORB cannot understand because its version of class A is different. In such situations, the CORBA standard provides a method to access the meta information ("meta call") about the class version of the object it just received.

When the client ORB makes a meta call to the server ORB for class A, the server ORB will send a complete description of the class which includes details, such as the name of the class, names of the members of the class as well as the type code information of the class. The information is then used by the client ORB to unmarshal the data received and ignore the fields that it cannot understand (e.g., ignore those fields that are not contained in its version of class A). Despite the fact that the client ORB may not understand these additional fields, the server ORB continues to send these extra fields whenever an instance of class A is sent to the client ORB. As a result, unnecessary data is being exchanged, where the information may be large, such as when one of the fields is an object reference to a complex object graph. An object reference identifies the distributed object that will receive the request. An object graph refers to groups of objects that form a network through their relationships with each other (either through a direct reference to another object or through a chain of intermediate references). Such object graphs may be complex, such as when the group of objects contains an application object, with references to the windows, menus and their reviews, and other supporting objects.

Furthermore, while the client ORB receives information regarding the description of the class existing at the server, the client ORB does not make use of such information when it sends its class definition in response to a meta call from the server (server ORB sends a meta call to the client ORB in response to receiving instance data for a class from the client ORB that is different from its class definition). The class definition sent by the client ORB may include additional information, which unnecessarily increases the size of the transmitted data, especially if a field is an object reference to a complex object graph.

As a result, the client and server ORBs continue to send and receive these extra fields, which are redundant, which unnecessarily increases the size of data being transmitted thereby diminishing overall performance.

BRIEF SUMMARY

In one embodiment of the present invention, a method for eliminating redundancy in instance data of different versioned classes in communication between object request brokers comprises deriving common class definitions for a class for both a client object request broker and a server object request broker from an intersection of fields present in a first and a second version of the class. The method further comprises serializing an instance of the class using the common class definition for the class for either the server object request broker or the client object request broker. In addition, the method comprises transmitting, by a processor, the serialized instance of the class.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for eliminating redundancy in instance data of different versioned classes in communication between object request brokers. In one embodiment of the present invention, an object request broker (ORB), such as a server ORB, derives common class definitions for the class for both the client ORB and the server ORB from an intersection of the fields present in the different versions of the class maintained at the client and server. The common class definition for the class for the server ORB will be relative to the version of the class existing at the client. Similarly, the common class definition for the class for the client ORB will be relative to the version of the class existing at the server. Each common class definition may be stored as a bitmap representation of the class, where each bit represents a field for compactness and where the bit value determines whether the field is required for the transaction. When a common class definition of a class exists, the ORB, such as the server ORB, serializes an instance of the class using its common class definition for the class thereby including only the fields useful for the ORB, such as the client ORB, receiving the serialized instance of the class. Similarly, the receiving ORB, such as the client ORB, deserializes the serialized instance of the class using its common class definition for the class thereby deserializing only those fields whose associated bit values in the common class definition are set. By deriving common class definitions for the class, redundant fields are no longer being transmitted between the client and server ORBs thereby reducing the size of data being transmitted and improving overall performance (reducing processing time and network bandwidth). Furthermore, by representing the common class definition in a compact form, such as a bitmap, the payload size is reduced. Additionally, by sharing the common class definition during a transaction between the client and server ORBs, additional meta requests are avoided.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
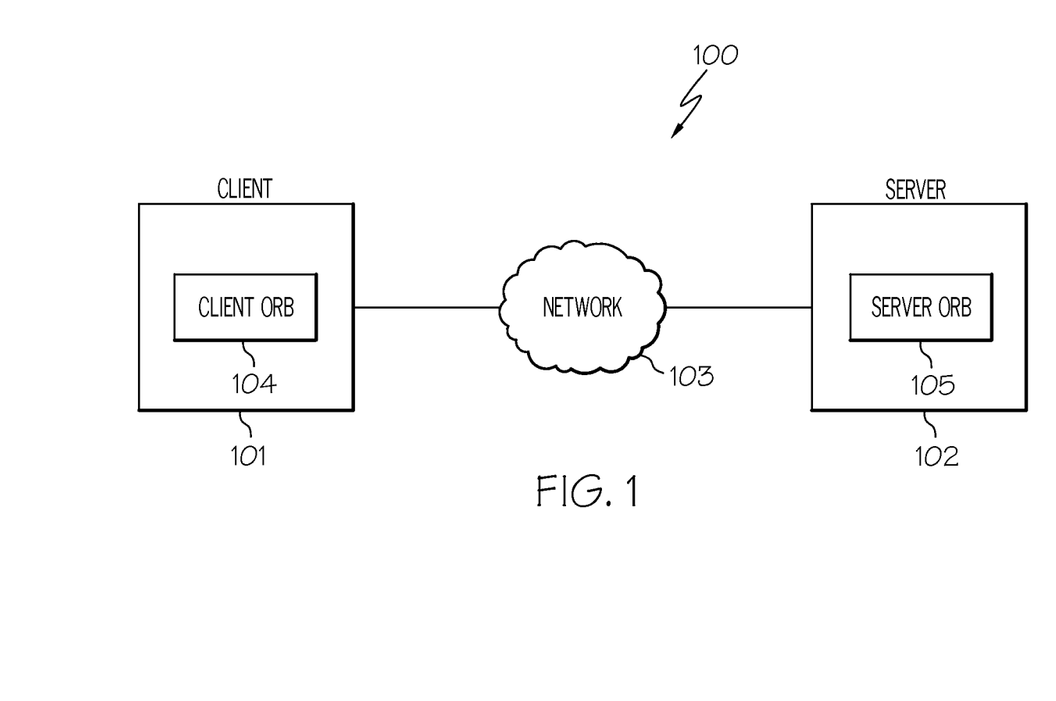
FIG. 1 illustrates an environment in which inter-network communications using CORBA may be implemented in accordance with an embodiment of the present invention.

Referring now to the Figures in detail, FIG. 1 illustrates an environment 100 in which inter-network communications using CORBA may be implemented in accordance with an embodiment of the present invention. Environment 100 includes a client computing system 101 (or simply referred to as "client") coupled to a server 102 via a network 103. Client 101 and server 102 are interconnected with network 103 via any medium type (e.g., wireless, wired). Client 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to network 103 and consequently communicating with server 102. In the CORBA architecture, client 101 may be said to be the "caller" in which client 101 is the originator of an object invocation. A description of the hardware configuration of client 101 is provided below in connection with FIG. 2.

Server 102 may be said to be the "handler" in which server 102 is the recipient of the object invocation. A description of the hardware configuration of server 102 is provided below in connection with FIG. 3.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with environment 100 of FIG. 1 without departing from the scope of the present invention.

Referring again to FIG. 1, client 101 may include a software component referred to herein as the client object request broker (ORB) 104. Server 102 may include a software component referred to herein as the server object request broker (ORB) 105. Client ORB 104 may be configured to mediate the remote method calls on client 101. Server ORB 105 mediates the handling of the remote method calls on server 102. A more detailed discussion of the functionality of client ORB 104 and server ORB 105 will be provided further below.

While FIG. 1 illustrates a single client 101 and a single server 102, environment 100 may include any number of clients 101 and servers 102. The embodiments of environment 100 are not to be limited in scope to the depiction of FIG. 1.

Figure 2:
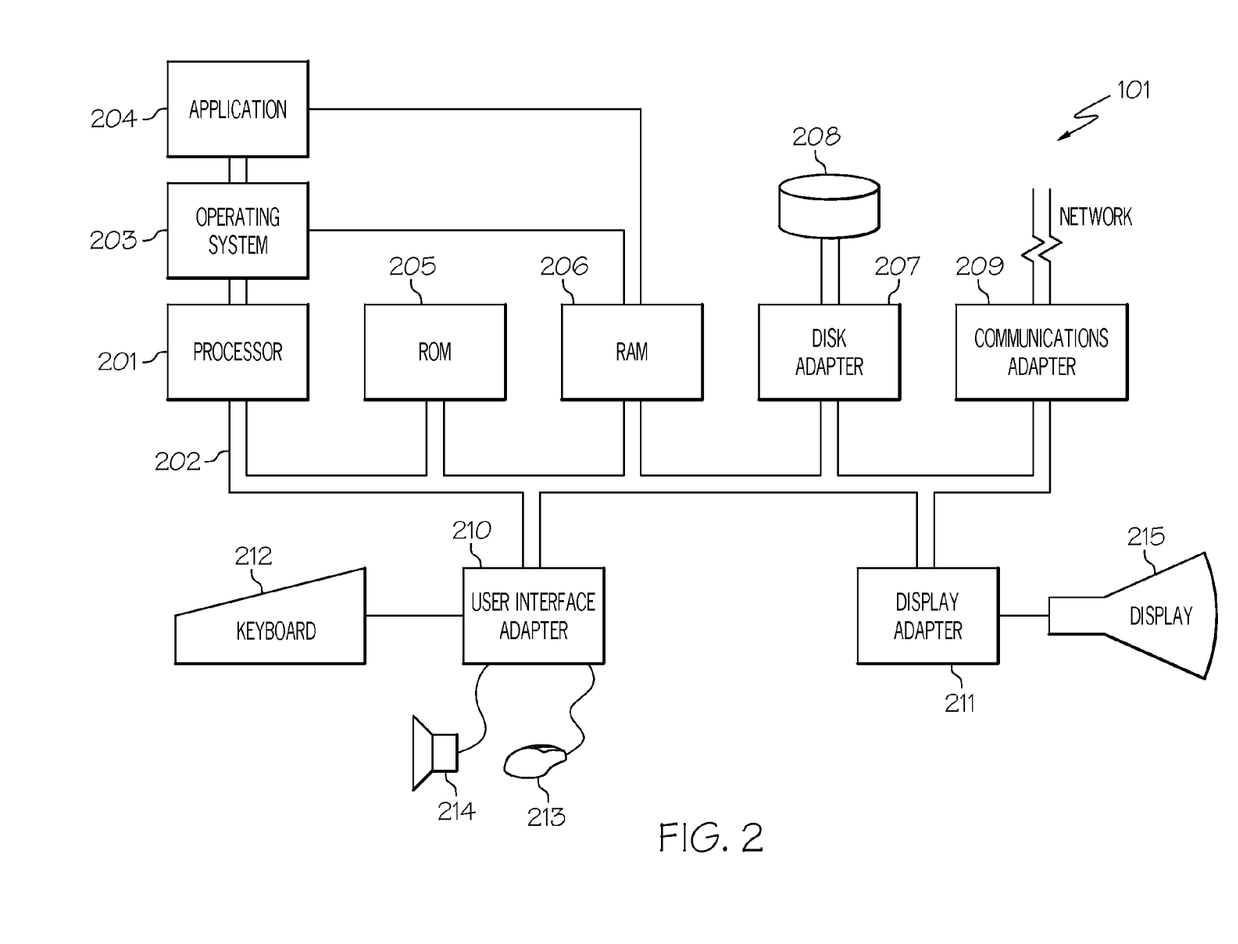
FIG. 2 illustrates a hardware configuration of a client in accordance with an embodiment of the present invention.

Referring now to FIG. 2, FIG. 2 illustrates a hardware configuration of client 101 (FIG. 1) which is representative of a hardware environment for practicing the present invention. Referring to FIG. 2, client 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, client ORB 104 (FIG. 1) as discussed further below in association with FIGS. 4A-4B and 5-10.

Referring again to FIG. 2, read-only memory ("ROM") 205 is coupled to system bus 202 and includes a basic input/output system ("BIOS") that controls certain basic functions of client 101. Random access memory ("RAM") 206 and disk adapter 207 are also coupled to system bus 202. It should be noted that software components including operating system 203 and application 204 may be loaded into RAM 206, which may be client's 101 main memory for execution. Disk adapter 207 may be an integrated drive electronics ("IDE") adapter that communicates with a disk unit 208, e.g., disk drive.

Client 101 may further include a communications adapter 209 coupled to bus 202. Communications adapter 209 interconnects bus 202 with an outside network (network 103 of FIG. 1) thereby enabling client 101 to communicate with server 102 (FIG. 1).

I/O devices may also be connected to client 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to client 101 through keyboard 212 or mouse 213 and receiving output from client 101 via display 215 or speaker 214.

Figure 3:
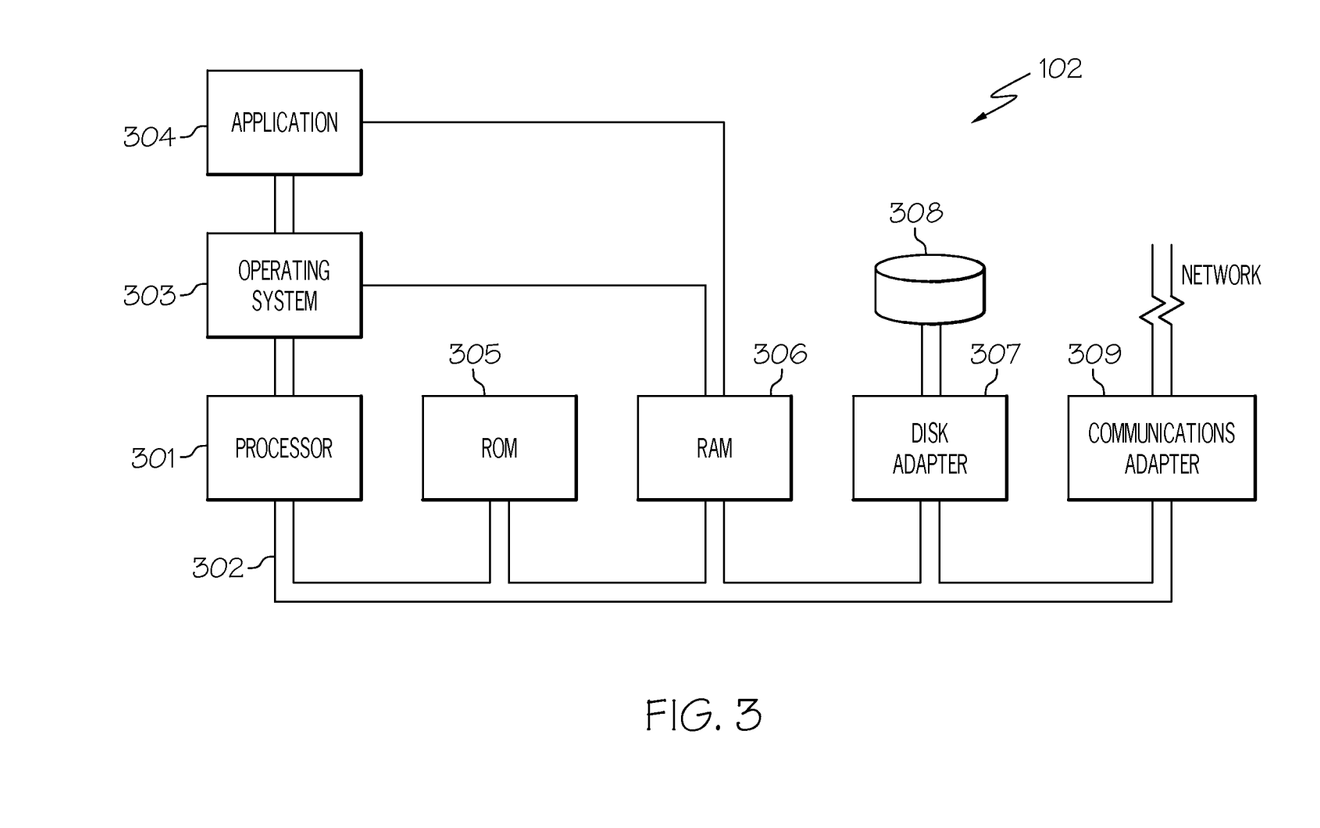
FIG. 3 illustrates a hardware configuration of a server in accordance with an embodiment of the present invention.

Referring now to FIG. 3, FIG. 3 illustrates a hardware configuration of server 102 (FIG. 1) which is representative of a hardware environment for practicing the present invention. Server 102 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a server ORB 105 (FIG. 1) as discussed further below in association with FIGS. 4A-4B and 5-10.

Referring again to FIG. 3, read-only memory ("ROM") 305 is coupled to system bus 302 and includes a basic input/output system ("BIOS") that controls certain basic functions of server 102. Random access memory ("RAM") 306 and disk adapter 307 are also coupled to system bus 302. It should be noted that software components including operating system 303 and application 304 may be loaded into RAM 306, which may be server's 102 main memory for execution. Disk adapter 307 may be an integrated drive electronics ("IDE") adapter that communicates with a disk unit 308, e.g., disk drive.

Server 102 may further include a communications adapter 309 coupled to bus 302. Communications adapter 309 interconnects bus 302 with an outside network (network 103 of FIG. 1) thereby enabling server 102 to communicate with client 101 (FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, the CORBA standard allows for different versions of a class to exist at both the server and client sides in a network system. In cases where there are different versions of a class, the server and/or the client may send and receive extra fields, which are redundant. With the client and server ORBs sending and receiving these extra fields, which are redundant, the size of data being transmitted is unnecessarily increased thereby diminishing overall performance.

Figure 4A:
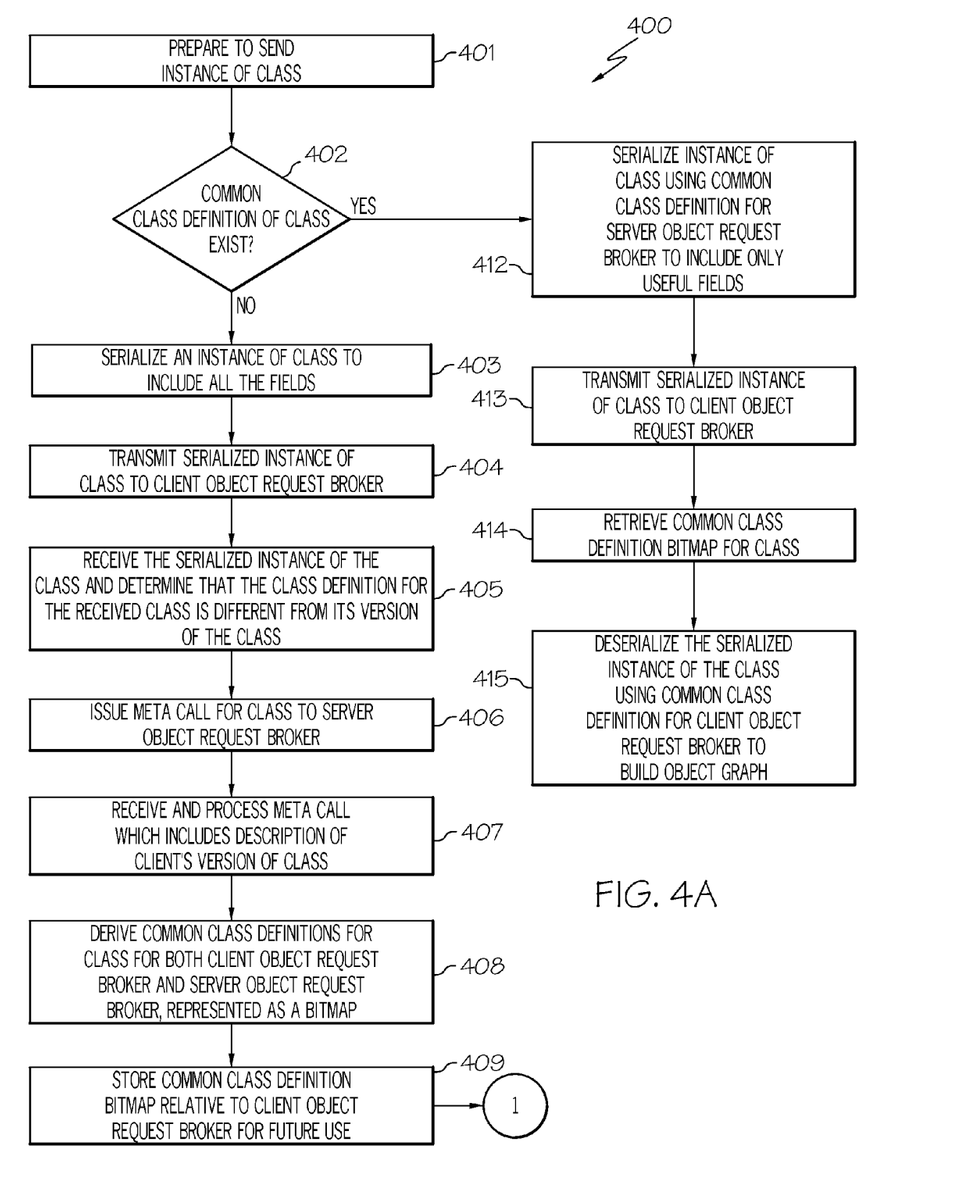
FIGS. 4A-4B are a flowchart of a method for eliminating redundancy in instance data of different versioned classes in communication between object request brokers in accordance with an embodiment of the present invention.
Figure 4B:
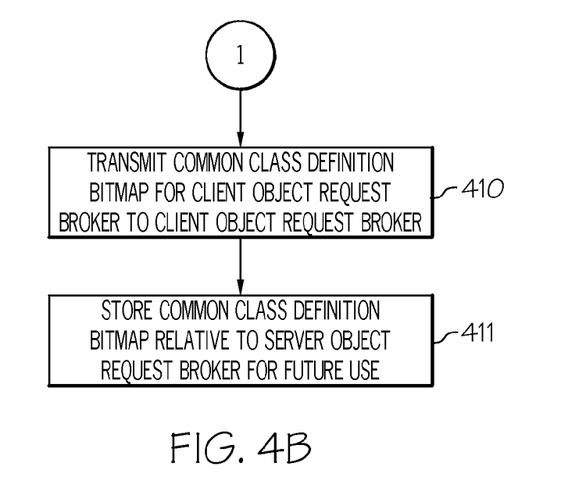
Figure 5:
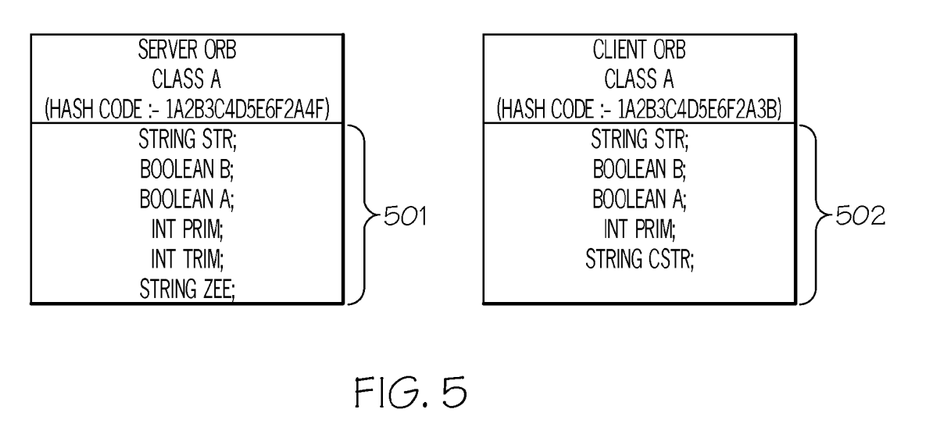
FIG. 5 is a pictorial representation of exemplary fields of two different versions of an exemplary class that are maintained by both the client and the server in accordance with an embodiment of the present invention.
Figure 6:
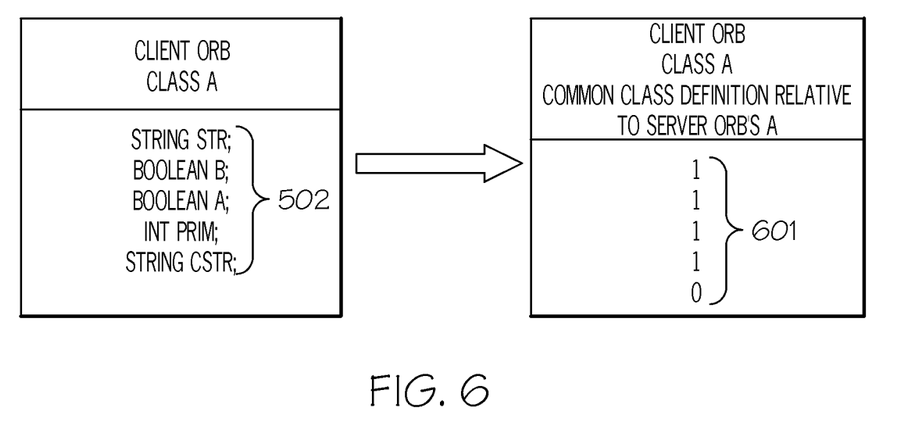
FIG. 6 is a pictorial representation of the common class definition for the class for the client ORB in accordance with an embodiment of the present invention.
Figure 7:
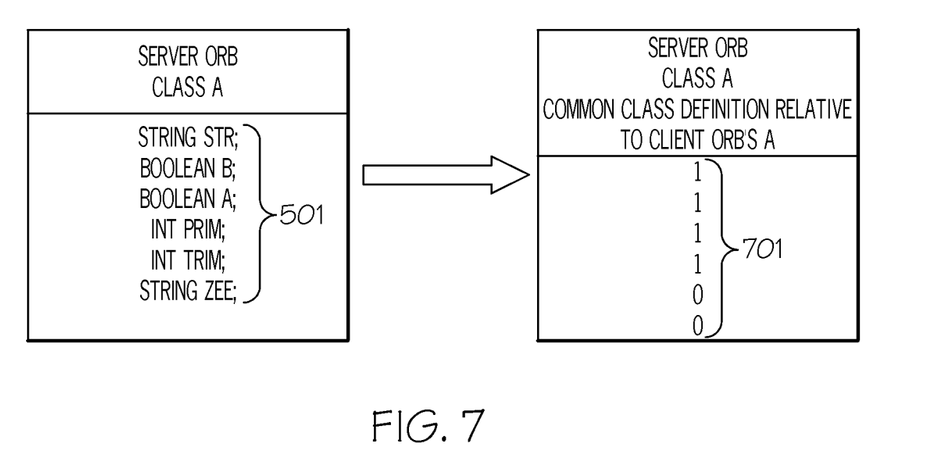
FIG. 7 is a pictorial representation of the common class definition for the class for the server ORB in accordance with an embodiment of the present invention.
Figure 8:
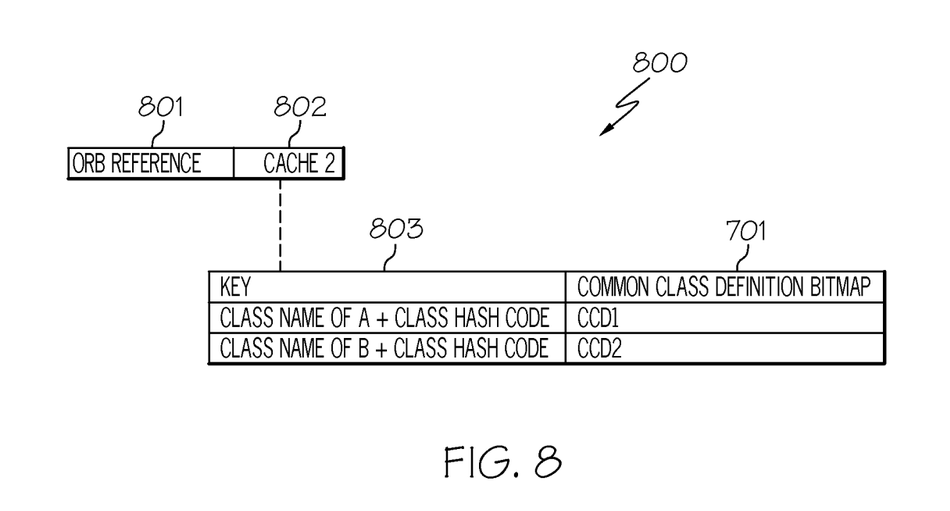
FIG. 8 is a pictorial representation of a caching strategy for the server in accordance with an embodiment of the present invention.
Figure 9:
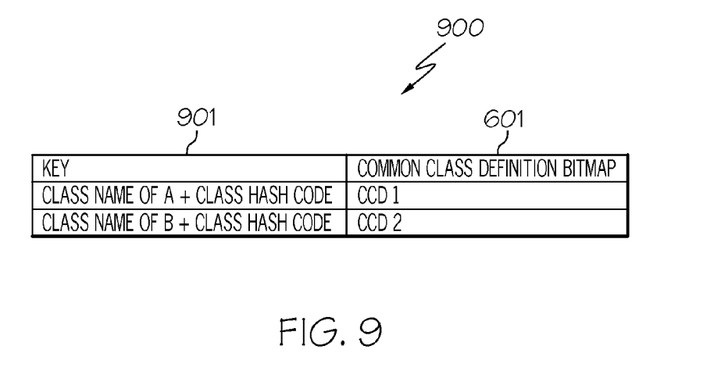
FIG. 9 is a pictorial representation of caching the common class definition bitmap on a per connection basis in the client in accordance with an embodiment of the present invention.
Figure 10:
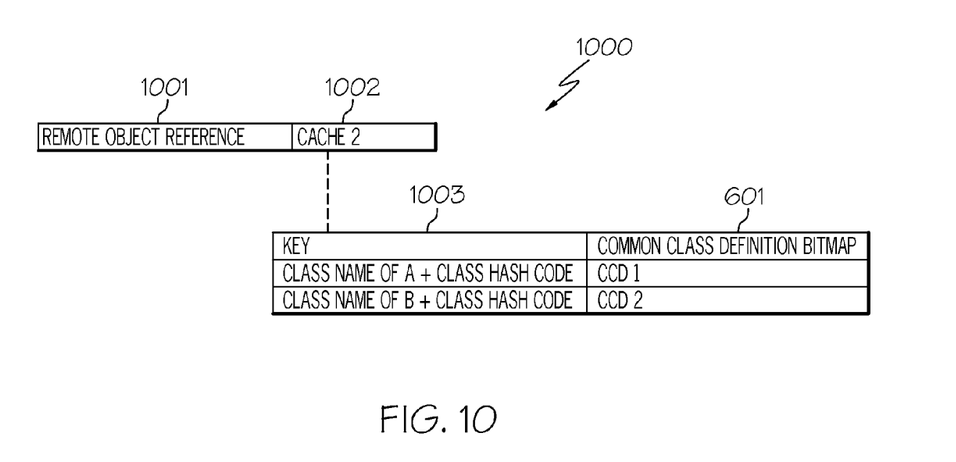
FIG. 10 is a pictorial representation of caching the common class definition bitmap on a per ORB basis in the client in accordance with an embodiment of the present invention.

The principles of the present invention provide a means for eliminating redundant fields being transmitted between the client and server ORBs thereby reducing the size of data being transmitted and improving overall performance (reducing processing time and network bandwidth) as discussed further below in connection with FIGS. 4A-4B and 5-10. FIGS. 4A-4B are a flowchart of a method for eliminating redundancy in instance data of different versioned classes in communication between object request brokers. FIG. 5 is a pictorial representation of exemplary fields of two different versions of an exemplary class that are maintained by both the client and the server. FIG. 6 is a pictorial representation of the common class definition for the class for the client ORB. FIG. 7 is a pictorial representation of the common class definition for the class for the server ORB. FIG. 8 is a pictorial representation of a caching strategy for the server. FIG. 9 is a pictorial representation of caching the common class definition bitmap on a per connection basis in the client. FIG. 10 is a pictorial representation of caching the common class definition bitmap on a per ORB basis in the client.

As stated above, FIGS. 4A-4B are a flowchart of a method 400 for eliminating redundancy in instance data of different versioned classes in communication between object request brokers in accordance with an embodiment of the present invention. FIGS. 4A-4B illustrate eliminating redundancy in instance data of different versioned classes in communication between object request brokers using the exemplary transaction of server ORB 105 (FIG. 1) sending a serialized instance of a class to client ORB 104 (FIG. 1). However, the principles of the present invention discussed in connection with FIGS. 4A-4B may be applied to the transaction of client ORB 104 sending a serialized instance of a class to server ORB 105. In such an embodiment, client ORB 104 would perform the steps in FIGS. 4A-4B indicated as being performed by server ORB 105 and vice-versa. Such embodiments would fall within the scope of the present invention.

Referring to FIG. 4A, in conjunction with FIGS. 1-3, in step 401, server ORB 105 prepares to send an instance of a class to client ORB 104. In step 402, a determination is made by server ORB 105 as to whether a common class definition (discussed further below) for the class exists. A common class definition allows server ORB 105 to transmit data to client ORB 104 that is only pertinent to client ORB 104. Similarly, the common class definition allows client ORB 104 to transmit data to server ORB 105 that is only pertinent to server ORB 105. A more detailed discussion of the common class definition is provided further below.

If a common class definition does not exist for the class, then the common class definition is derived. In one embodiment, the common class definition is derived by implementing the following steps (steps 403-408). In step 403, server ORB 105 serializes an instance of a version of a class to include all the fields of the class as illustrated in FIG. 5.

FIG. 5 is a pictorial representation of exemplary fields of two different versions of an exemplary class that are maintained by both client 101 and server 102 in accordance with an embodiment of the present invention. Referring to FIG. 5, FIG. 5 illustrates the exemplary fields 501 of a version of an exemplary class (identified as "Class A" in FIG. 5) that is maintained by server 102 with a corresponding hash code of 1A2B3C4D5E6F2A4F that is generated upon performing the hash function on the fields 501 of the class maintained by server 102. As illustrated in FIG. 5, fields 501 of the version of Class A maintained by server 102 include String str; Boolean b; Boolean a; int prim; int trim; and String zee. When server ORB 105 serializes an instance of a version of a class maintained by server 102 in step 403, it includes all the fields of its version of the class. Hence, in the example of FIG. 5, server ORB 105 serializes an instance of the version of Class A to include the fields of String str; Boolean b; Boolean a; int prim; int trim; and String zee. As also illustrated in FIG. 5, a different version of the class (identified as "Class A") may be maintained by client 101. Fields 502 of a version of Class A maintained by client 101 include String str; Boolean b; Boolean a; int prim; and String cstr. As a result of having a different version of Class A (and hence different fields), a different hash code is generated by performing the hash function on the fields of the class. For example, a hash code of 1A2B3C4D5E6F2A3B is generated by performing the hash function on the fields of the class maintained by client 101.

Returning to FIG. 4A, in conjunction with FIGS. 1-3, in step 404, server ORB 105 transmits the serialized instance of the class (generated in step 403) to client ORB 104.

In step 405, client ORB 104 receives the serialized instance of the class from server ORB 105, and, from the hash code in the meta data sent by server ORB 105, determines that the received class is different from its version of the class. For example, referring to FIG. 5, upon client ORB 104 receiving the serialized instance of the class from server ORB 105, client ORB 104 determines from the meta data of the received serialized instance that the hash code of the version of the class maintained by server 102 (1A2B3C4D5E6F2A4F) differs from the hash code of its version of the class (1A2B3C4D5E6F2A3B).

As a result of determining that the class definition is different from its version of the class, client ORB 104, in step 406, issues a meta call for the class to server ORB 105. In one embodiment, the meta call includes a complete description of the version of the class maintained by client 101, such as its super classes and its fields (including their names and type). For example, referring to FIG. 5, the meta call may include fields 502 of the version of the class maintained by client 101.

Upon receiving the meta call along with the complete description of the version of the class maintained by client 101, in step 407, server ORB 105 receives and processes the meta call which includes the description of the client's 101 version of the class.

In step 408, server ORB 105 derives common class definitions for the class for both client ORB 104 and server ORB 105, represented as a bitmap. In one embodiment, the common class definition will be stored as a bitmap representation of the class, where each bit represents a field for compactness. In one embodiment, the bit value determines whether the field is required for the transaction. In one embodiment, the common class definitions for the class for both client ORB 104 and server ORB 105 are derived from an intersection of the fields (e.g., fields 501, 502 of FIG. 5) present in both the versions of the class maintained by both client 101 and server 102 as illustrated in FIGS. 6 and 7. By deriving common class definitions for the class as discussed herein, redundant fields are no longer being transmitted between client and server ORBs 104, 105 thereby reducing the size of data being transmitted and improving overall performance (reducing processing time and network bandwidth). Furthermore, as discussed herein, the common class definition may be represented in a compact form, such as a bitmap, which reduces the payload size. Additionally, as discussed herein, by sharing the common class definition during a transaction between client and server ORBs 104, 105, additional meta requests are avoided.

FIG. 6 is a pictorial representation of the common class definition for the class for client ORB 104 in accordance with an embodiment of the present invention. Referring to FIG. 6, the common class definition for the class stored on client 101 will be relative to the version of the class existing at server 102. For instance, the common class definition (ccd) bitmap 601 for client ORB 104 is ccd={1, 1, 1, 1, 0}, where the indexes correspond to each field in the field array in the version of the class maintained by client 101. The common class definition bitmap 601 for client ORB 104 is {1, 1, 1, 1, 0} since the version of the class maintained by server 102 (see fields 501 of FIG. 5) includes the fields String str; Boolean b; Boolean a; and int prim but does not include the field String cstr. That is, the common class definition bitmap 601 for client ORB 104 shows a "0" for the field String cstr since it is not present in the class definition of the class maintained by server 102.

Similarly, the common class definition for the class stored on server 102 will be relative to the version of the class existing at client 101 as illustrated in FIG. 7. FIG. 7 is a pictorial representation of the common class definition for the class for server ORB 105 in accordance with an embodiment of the present invention.

Referring to FIG. 7, the common class definition (ccd) bitmap 701 for server ORB 105 is ccd={1, 1, 1, 1, 0, 0}, where the indexes correspond to each field in the field array in the version of the class maintained by server 102. The common class definition bitmap 701 for server ORB 105 is {1, 1, 1, 1, 0, 0} since the version of the class maintained by client 101 (see fields 502 of FIG. 5) includes the fields String str; Boolean b; Boolean a; and int prim but does not include the fields int trim and String zee. That is, the common class definition bitmap 701 for server ORB 105 shows a "0" for the fields int trim and String zee since they are not present in the class definition of the class maintained by client 101.

Returning to FIG. 4A, in conjunction with FIGS. 1-3 and 7, in step 409, server ORB 105 stores the common class definition bitmap 701 relative to client ORB 101 for future use. In one embodiment, the common class definition bitmap 701 for server ORB 105 is stored in a cache (e.g., cache may be located internal to processor 301 or external to processor 301, such as disk unit 308) as illustrated in FIG. 8.

FIG. 8 is a pictorial representation of a caching strategy for server 102 in accordance with an embodiment of the present invention. Referring to FIG. 8, in conjunction with FIG. 7, in one embodiment, server 102 may maintain a two-level cache 800, where the identity of client ORB 104 in the form of a reference 801 (identified as "ORB reference" in FIG. 8), is used as a key to index into an entry 802 in the first level of the cache. The value obtained from the indexed entry in the first level of the cache identifies a cache (a second level), where a key 803 used to index the second level cache includes the class name (including the package name) as well as the hash code of the class (examples include "Class name of A+Class hash code" and "Class name of B+Class hash code" in FIG. 8). The value in the indexed entry of the second level cache corresponds to the common class definition bitmap 701 (examples include "ccd 1" and "ccd 2" in FIG. 8).

Referring now to FIG. 4B, in conjunction with FIGS. 1-3 and 6, in step 410, server ORB 105 transmits the common class definition bitmap 601 for client ORB 104 to client ORB 104. In step 411, client ORB 104 stores the common class definition bitmap 601 relative to server ORB 105 for future use which will be used to instantiate the class. In one embodiment, the common class definition bitmap 601 for client ORB 104 is stored in a cache (e.g., cache may be located internal to processor 201 or external to processor 201, such as disk unit 208). Common class definition bitmap 601 may be stored in a cache using two different caching strategies. One caching strategy is to cache common class definition bitmap 601 on a per connection basis as discussed in connection with FIG. 9. Another caching strategy is to cache common class definition bitmap 601 on a per ORB basis as discussed in connection with FIG. 10.

FIG. 9 is a pictorial representation of caching a common class definition bitmap on a per connection basis in client 101 in accordance with an embodiment of the present invention. Referring to FIG. 9, in conjunction with FIG. 6, common class definition bitmaps 601 are stored in a cache 900 per connection and discarded when the connection is closed. In one embodiment, each entry in cache 900 may be indexed via a key 901 (examples include "Class name of A+Class hash code" and "Class name of B+Class hash code" in FIG. 9), where the value of the indexed entry contains the common class definition bitmap 601 (examples include "ccd 1" and "ccd 2" in FIG. 9).

FIG. 10 is a pictorial representation of caching a common class definition bitmap on a per ORB basis in client 101 in accordance with an embodiment of the present invention. Referring to FIG. 10, in conjunction with FIG. 6, in one embodiment, client 101 may maintain a two-level cache 1000, where the identity of server ORB 105 in the form of a reference 1001 (identified as "remote object reference" in FIG. 10), is used as a key to index into an entry 1002 in the first level of the cache. The value obtained from the indexed entry in the first level of the cache identifies a cache (a second level), where a key 1003 used to index the second level cache includes the class name (including the package name) as well as the hash code of the class (examples include "Class name of A+Class hash code" and "Class name of B+Class hash code" in FIG. 10). The value in the indexed entry of the second level cache corresponds to the common class definition bitmap 601 (examples include "ccd 1" and "ccd 2" in FIG. 10).

Referring to step 402 of FIG. 4A, in conjunction with FIGS. 1-3 and 6-8, if a common class definition does exist for the class, then, in step 412, server ORB 105 serializes the instance of the class using the common class definition for server ORB 105 to include only the fields useful for client ORB 104. For example, server ORB 105 would retrieve common class definition bitmap 701, such as from cache 800, and use common class definition bitmap 701 to serialize the instance of the class. For instance, referring to FIG. 7, server ORB 105 would check to see if the bit value for each bit in common class definition bitmap 701 corresponding to a field is set (e.g., includes a "1") or is not set (e.g., includes a "0"). Hence, server ORB 105 would serialize those fields whose associated bit values in common class definition bitmap 701 are set. Using the example of FIG. 7, server ORB 105 would serialize the fields of String str; Boolean b; Boolean a; and int prim. These are the fields that are included in the version of the class maintained by client 101 as illustrated by the listing of fields 502 of FIG. 5. By only serializing these fields, and not including fields that are not included in the version of the class maintained by client 101, the size of the data being transmitted is reduced thereby improving overall performance (reducing processing time and network bandwidth).

In step 413, server ORB 105 transmits the serialized instance of the class to client ORB 104.

In step 414, client ORB 104 retrieves the common class definition bitmap 601 for the class, such as by performing a look-up in a cache, as discussed above in connection with FIGS. 9-10.

In step 415, client ORB 104 deserializes the serialized instance of the class using the common class definition for client ORB 104 (i.e., using common class definition bitmap 601) to build an object graph. An object graph refers to groups of objects that form a network through their relationships with each other (either through a direct reference to another object or through a chain of intermediate references). Such object graphs may be complex, such as when the group of objects contains an application object, with references to the windows, menus and their reviews, and other supporting objects.

For example, client ORB 104 would retrieve common class definition bitmap 601, such as from cache 1000, and use common class definition bitmap 601 to deserialize the received serialized instance of the class. For instance, referring to FIG. 6, client ORB 104 would check to see if the bit value for each bit in common class definition bitmap 601 corresponding to a field is set (e.g., includes a "1") or is not set (e.g., includes a "0"). Hence, client ORB 104 would deserialize those fields whose associated bit values in common class definition bitmap 601 are set and skip deserializing those fields whose associated bit values in common class definition bitmap 601 are not set. Using the example of FIG. 6, client ORB 104 would deserialize the fields of String str; Boolean b; Boolean a; and int prim.

In some implementations, method 400 may include other and/or additional steps that, for clarity, are not depicted. Further, in some implementations, method 400 may be executed in a different order presented and that the order presented in the discussion of FIGS. 4A-4B is illustrative. Additionally, in some implementations, certain steps in method 400 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for eliminating redundancy in instance data of different versioned classes in communication between object request brokers, the method comprising:

deriving common class definitions for a class for both a client object request broker and a server object request broker from an intersection of fields present in a first and a second version of said class;

serializing an instance of said class using said common class definition for said class for one of said server object request broker and said client object request broker; and transmitting, by a processor, said serialized instance of said class.

2. The method as recited in claim 1, wherein said common class definitions for said class are stored as a bitmap representation of said class, wherein each bit of said bitmap representation represents a field of said class.

3. The method as recited in claim 1, wherein said common class definition for said class for said server object request broker comprises a bitmap representation of said class relative to said second version of said class existing at a client, wherein said common class definition for said class for said client object request broker comprises a bitmap representation of said class relative to said first version of said class existing at a server.

4. The method as recited in claim 1 further comprising:

serializing an instance of said first version of said class to include all fields of said first version of said class;

transmitting said serialized instance of said first version of said class; and receiving a meta call for said class, wherein said meta call comprises a description of said second version of said class, wherein said description of said second version of said class comprises a description of fields present in said second version of said class.

5. The method as recited in claim 1 further comprising:

storing said common class definition for said server object request broker in a cache in a server; and transmitting said common class definition for said client object request broker to said client object request broker.

6. The method as recited in claim 5 further comprising:

storing said common class definition for said client object request broker in a cache in a client.

7. The method as recited in claim 1 further comprising:

deserializing said serialized instance of said class using said common class definition for said class for one of said server object request broker and said client object request broker.

8. A computer program product embodied in a computer readable storage medium for eliminating redundancy in instance data of different versioned classes in communication between object request brokers, the computer program product comprising the programming instructions for:

deriving common class definitions for a class for both a client object request broker and a server object request broker from an intersection of fields present in a first and a second version of said class;

serializing an instance of said class using said common class definition for said class for one of said server object request broker and said client object request broker; and transmitting said serialized instance of said class.

9. The computer program product as recited in claim 8, wherein said common class definitions for said class are stored as a bitmap representation of said class, wherein each bit of said bitmap representation represents a field of said class.

10. The computer program product as recited in claim 8, wherein said common class definition for said class for said server object request broker comprises a bitmap representation of said class relative to said second version of said class existing at a client, wherein said common class definition for said class for said client object request broker comprises a bitmap representation of said class relative to said first version of said class existing at a server.

11. The computer program product as recited in claim 8 further comprising the programming instructions for:
   serializing an instance of said first version of said class to include all fields of said first version of said class;
   transmitting said serialized instance of said first version of said class; and
   receiving a meta call for said class, wherein said meta call comprises a description of said second version of said class, wherein said description of said second version of said class comprises a description of fields present in said second version of said class.

12. The computer program product as recited in claim 8 further comprising the programming instructions for:
   storing said common class definition for said server object request broker in a cache in a server; and
   transmitting said common class definition for said client object request broker to said client object request broker.

13. The computer program product as recited in claim 12 further comprising the programming instructions for:
   storing said common class definition for said client object request broker in a cache in a client.

14. The computer program product as recited in claim 8 further comprising the programming instructions for:
   deserializing said serialized instance of said class using said common class definition for said class for one of said server object request broker and said client object request broker.

15. A system, comprising:
   a memory unit for storing a computer program for eliminating redundancy in instance data of different versioned classes in communication between object request brokers; and
   a processor coupled to said memory unit, wherein said processor, responsive to said computer program, comprises:
      circuitry for deriving common class definitions for a class for both a client object request broker and a server object request broker from an intersection of fields present in a first and a second version of said class;
      circuitry for serializing an instance of said class using said common class definition for said class for one of said server object request broker and said client object request broker; and
      circuitry for transmitting said serialized instance of said class.

16. The system as recited in claim 15, wherein said common class definitions for said class are stored as a bitmap representation of said class, wherein each bit of said bitmap representation represents a field of said class.

17. The system as recited in claim 15, wherein said common class definition for said class for said server object request broker comprises a bitmap representation of said class relative to said second version of said class existing at a client, wherein said common class definition for said class for said client object request broker comprises a bitmap representation of said class relative to said first version of said class existing at a server.

18. The system as recited in claim 15, wherein said processor further comprises:
   circuitry for serializing an instance of said first version of said class to include all fields of said first version of said class;
   circuitry for transmitting said serialized instance of said first version of said class; and
   circuitry for receiving a meta call for said class, wherein said meta call comprises a description of said second version of said class, wherein said description of said second version of said class comprises a description of fields present in said second version of said class.

19. The system as recited in claim 15, wherein said processor further comprises:
   circuitry for storing said common class definition for said server object request broker in a cache in a server; and
   circuitry for transmitting said common class definition for said client object request broker to said client object request broker.

20. The system as recited in claim 15, wherein said processor further comprises:
   circuitry for deserializing said serialized instance of said class using said common class definition for one of said server object request broker and said client object request broker.

* * * * *